United States Patent
Lin et al.

(10) Patent No.: US 10,124,779 B2
(45) Date of Patent: Nov. 13, 2018

(54) SUPERVISING METHOD FOR DYNAMIC AND LARGE DATA LOADS IN AUTOMOTIVE SYSTEMS

(71) Applicant: TOYOTA JIDOSHA KABUSHIKI KAISHA, Toyota-shi, Aichi-ken (JP)

(72) Inventors: Chung-Wei Lin, Sunnyvale, CA (US); Huafeng Yu, Cupertino, CA (US); Bowen Zheng, Riverside, CA (US)

(*) Notice: Subject to any disclaimer, the term of this patent is extended or adjusted under 35 U.S.C. 154(b) by 188 days.

(21) Appl. No.: 15/161,003

(22) Filed: May 20, 2016

(65) Prior Publication Data

US 2017/0339034 A1    Nov. 23, 2017

(51) Int. Cl.
| | |
|---|---|
| *B60T 8/172* | (2006.01) |
| *H04L 29/08* | (2006.01) |
| *H04L 12/26* | (2006.01) |
| *H04L 12/801* | (2013.01) |
| *H04L 12/825* | (2013.01) |
| *H04L 12/823* | (2013.01) |

(52) U.S. Cl.
CPC .......... *B60T 8/172* (2013.01); *H04L 43/0876* (2013.01); *H04L 47/12* (2013.01); *H04L 47/25* (2013.01); *H04L 67/12* (2013.01); *H04L 47/32* (2013.01)

(58) Field of Classification Search
CPC ....................................................... B06T 8/172
See application file for complete search history.

(56) References Cited

U.S. PATENT DOCUMENTS

| | | | | |
|---|---|---|---|---|
| 5,113,185 A * | 5/1992 | Ichikawa | ............. | G09B 29/106 340/990 |
| 6,278,921 B1 * | 8/2001 | Harrison | ................ | G01C 21/26 340/426.15 |
| 6,894,717 B2 * | 5/2005 | Bakewell | ............. | G08G 1/0175 340/937 |
| 6,930,592 B2 * | 8/2005 | Schlecht | ................ | B60R 5/047 340/426.1 |
| 7,089,099 B2 * | 8/2006 | Shostak | ................ | B60C 23/005 701/29.6 |
| 7,262,790 B2 * | 8/2007 | Bakewell | ............... | G08G 1/054 340/936 |
| 7,421,321 B2 * | 9/2008 | Breed | ..................... | B60C 11/24 340/442 |

(Continued)

*Primary Examiner* — Jimmy H Tran
(74) *Attorney, Agent, or Firm* — Burbage Law, P.C.; Jon-Michael Burbage; Elizabeth Ruzich

(57) ABSTRACT

The disclosure includes implementations for supervising a data load for a vehicle. The method may include receiving report data that may describe a data load for the supervised component. The method may include retrieving specification data for the supervised component that describes a threshold for the data load. The method may include performing an analysis of the data load to determine whether the data load exceeds the threshold. The method may include providing graphical data to an electronic display panel to cause the electronic display panel to display a message responsive to the analysis indicating that the data load exceeds the threshold. The method may include providing an accommodation to the supervised component so that the data load does not exceed the threshold, where the accommodation includes stopping an operation of a device of the vehicle.

20 Claims, 7 Drawing Sheets

(56) References Cited

U.S. PATENT DOCUMENTS

| | | | |
|---|---|---|---|
| 7,672,768 B2* | 3/2010 | Narisawa | B66C 23/905 340/438 |
| 8,712,619 B2* | 4/2014 | Kusumi | B60K 6/46 701/22 |
| 8,831,677 B2* | 9/2014 | Villa-Real | H04M 1/66 455/552.1 |
| 9,188,449 B2* | 11/2015 | Biswal | G01C 21/26 |
| 9,249,710 B2* | 2/2016 | Mori | F01N 3/2066 |
| 9,373,149 B2* | 6/2016 | Abhyanker | G06Q 50/28 |
| 9,682,711 B2* | 6/2017 | Lee | B60W 50/14 |
| 9,810,131 B2* | 11/2017 | Iwata | F01N 9/002 |
| 9,914,333 B2* | 3/2018 | Shank | B62D 15/0285 |
| 2002/0019689 A1* | 2/2002 | Harrison | G01C 21/26 701/33.4 |
| 2005/0192732 A1* | 9/2005 | Narisawa | B66C 23/905 701/50 |
| 2005/0273218 A1* | 12/2005 | Breed | B60C 11/24 701/2 |
| 2006/0025897 A1* | 2/2006 | Shostak | B60C 23/005 701/1 |
| 2008/0190705 A1* | 8/2008 | Terry | B66B 3/00 187/249 |
| 2011/0130905 A1* | 6/2011 | Mayer | G07C 5/008 701/22 |
| 2011/0130916 A1* | 6/2011 | Mayer | G07C 5/008 701/31.4 |
| 2013/0096921 A1* | 4/2013 | Kuwamoto | G08G 1/0962 704/260 |
| 2013/0269735 A1* | 10/2013 | Roetzel | E21B 21/062 134/40 |
| 2014/0136414 A1* | 5/2014 | Abhyanker | G06Q 50/28 705/44 |
| 2014/0288763 A1* | 9/2014 | Bennett | B62D 11/18 701/31.6 |
| 2015/0160019 A1* | 6/2015 | Biswal | G01C 21/26 701/1 |
| 2016/0330593 A1* | 11/2016 | Caperell | H04W 4/046 |

* cited by examiner

SUPERVISING METHOD FOR DYNAMIC AND LARGE DATA LOADS IN AUTOMOTIVE SYSTEMS

BACKGROUND

The specification relates to a data load supervisor for an automotive system.

An automotive system may include a vehicle. Vehicles increasingly include vehicle control systems. For example, a vehicle may be an autonomous vehicle or include an Advanced Driver Assistance System (herein an "ADAS system").

More and more functions for autonomous driving or ADAS systems will be deployed in vehicles in the future. These functions will generate large amounts of computation and communication data loads for automotive components.

The data loads resulting from the functions for automotive control systems may be dynamic. For example, these data loads may increase or decrease depending on different variables. Examples of variables that cause dynamic data loads may include one or more of the following: variable lighting conditions (e.g., daytime versus nighttime, clouds that block light, buildings that block light, trees that block lights, etc.); variable vehicle speed; variable roadway surface friction; variable traffic volume; and unpredictable driving behavior of other vehicles or other variable traffic conditions.

As a result of these large or dynamic data loads, it may be difficult for automotive systems to handle functions for vehicle control systems. This difficulty may result in serious safety or security concerns.

SUMMARY

Described are implementations that include a system, method and computer program product for supervising data loads for a vehicle.

Existing network architectures for vehicle have limitations to support data loads that may exceed the specification for the vehicle or the vehicle components. For example, an autonomous vehicle may generate data loads for an electronic control unit that exceeds the recommended data load for the electronic control unit or a sensor whose operation is managed by the electronic control unit. Even if the usage of high-bandwidth network architectures (e.g., Ethernet-based networks) is considered, it is not sufficient as data loads will continue increasing and changing dynamically.

Two objectives are desired but not achieved by existing vehicle network architectures: (1) warning messages should be given to drivers if the system cannot support the current data load; and (2) data load information (especially data load information for dynamic loads) should be recorded so that technicians and system designers can use this load information to optimize system settings and future vehicle designs or software patches.

Described are implementations that may include a method in which a data load supervisor may be integrated to monitor and accommodate data loads for one or more supervised components. The supervised components may be specially manufactured to include a report module. The report module may security provide load data to the data load supervisor. The load data may describe a data load for a supervised component. The data load supervisor may collect the load data. The data load supervisor may analyze the load data to determine one or more of the following: whether it is feasible to allow the supervised component to continue to experience the data load described by load data; whether the data load indicates a security issue for the vehicle (e.g., hacking, denial of service attack, etc.); which vehicle state is indicated by the data load (e.g., a danger state, a warning state, a caution state, or a normal state); and whether the data load may be accommodated so that the data load does not exceed a threshold described a specification for the supervised component.

In some implementations, the data load supervisor may also generate graphical data for causing an electronic display panel to display a message for a driver responsive to the analysis of the data load.

In some implementations, the data load supervisor may store supervisor data that describes the data load for the supervised component. The supervisor data may be provided to technicians or system designers so that they may use this information to optimize system settings for the vehicle or improve future vehicle designs or software patches for the vehicle. re vehicle designs or software patches.

Depending on the analysis results, four vehicle states are possible.

First, a "danger state" may indicate that there is an immediate danger, and it is not resolvable even if the data load supervisor provides an accommodation. In this vehicle state the data load supervisor may generate graphical data that causes the electronic display panel to display a message that suggests that the driver stop driving immediately.

Second, a "warning state" may indicate that the vehicle is not in immediate danger because of the data load, but the vehicle needs to be checked by a technician. In this vehicle state the data load supervisor may generate graphical data that causes the electronic display panel to display a message that suggests that the driver drive with caution and have the vehicle inspected soon.

Third, a "caution state" may indicate that that the vehicle is not in immediate danger because of the data load, but the driver should drive with caution. In this vehicle state the data load supervisor may generate graphical data that causes the electronic display panel to display a message that suggests that the driver drive with caution.

Fourth, a "normal state" may indicate that the vehicle or the supervised component is operating within specification or any data load that exceeds the specification can be accommodated by the data load supervisor so that the data load is within specification.

Example implementations of the data load supervisor are now described.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a system including: a supervised component including a report module, where the supervised component is an element of a vehicle; a data load supervisor that is an element of the vehicle; and an electronic display panel communicatively coupled to the data load supervisor, where the electronic display panel is an element of the vehicle; where the supervised component is communicatively coupled to the data load supervisor via a communicative coupling; where the report module provides load data to the data load supervisor via the communicatively coupling; where the load data describes a data load of the supervised component; where the data load supervisor performs an analysis of the data load to determine whether the data load exceeds a threshold described by a specification associated with the supervised component; and where the data load supervisor causes the electronic display panel to display a message responsive to the analysis. Other embodiments of this aspect include corresponding computer systems, apparatus, and computer programs recorded on one or more computer storage devices, each configured to perform the actions of the methods.

Implementations may include one or more of the following features. The system where the supervised component is an electronic control unit of the vehicle that includes the report module. The system where the supervised component is an onboard vehicle computer of the vehicle that includes the report module. The system where the supervised component is a network-enabled device of the vehicle that includes the report module. The system where the communicative coupling that communicatively couples the supervised component and the data load supervisor is a hard wired communicative coupling. The system where the communicative coupling that communicatively couples the supervised component and the data load supervisor is a wireless communicative coupling. The system where the report module provides the load data to the data load supervisor via Bluetooth. The system where the report module provides the load data to the data load supervisor via Wi-Fi. The system where the report module provides the load data to the data load supervisor via Dedicated Short Range Communication ("DSRC"). The system where the electronic display panel is an element of a head unit included in the vehicle and the head unit is communicatively coupled to the data load supervisor to receive the graphical data for causing the electronic display panel to generate a graphical user interface that includes the message. The system where the vehicle is an autonomous vehicle and the autonomous vehicle navigates to a break-down lane and powers down responsive to the analysis. Implementations of the described techniques may include hardware, a method or process, or computer software on a computer-accessible medium.

One general aspect includes a method including: providing, by a report module that is an element of a supervised component, load data to a data load supervisor via a communicatively coupling shared between the supervised component and the data load supervisor, where the load data describes a data load of the supervised component; providing, by the data load supervisor, an analysis of the data load to determine whether the data load exceeds a threshold described by a specification associated with the supervised component; and providing, by the data load supervisor, graphical data to an electronic display panel to cause the electronic display panel to display a message responsive to the analysis. Other embodiments of this aspect include corresponding computer systems, apparatus, and computer programs recorded on one or more computer storage devices, each configured to perform the actions of the methods.

Implementations may include one or more of the following features. The method where the analysis indicates that the data load exceeds the threshold and the message suggests that the vehicle stop driving immediately. The method where the analysis indicates that the data load exceeds the threshold and the message suggests that the vehicle be serviced by a technician. The method further including: providing, by the data load supervisor, an accommodation to the supervised component where the accommodation includes one or more of throttling a future data load placed on the supervised component and stopping an operation of a function that would result in an increase in the data load for the supervised component. Implementations of the described techniques may include hardware, a method or process, or computer software on a computer-accessible medium.

One general aspect includes a computer program product including a non-transitory memory storing computer-executable code that, when executed by a processor, causes the processor to: receive report data from a communicative coupling shared with a supervised component that includes a report module that transmits a message including the report data, where the report data describes a data load for the supervised component; retrieve specification data for the supervised component that describes a threshold for the data load; perform an analysis of the data load to determine whether the data load exceeds the threshold; provide graphical data to an electronic display panel to cause the electronic display panel to display a message responsive to the analysis indicating that the data load exceeds the threshold; and provide an accommodation to the supervised component so that the data load does not exceed a value that is substantially equal to the threshold. Other embodiments of this aspect include corresponding computer systems, apparatus, and computer programs recorded on one or more computer storage devices, each configured to perform the actions of the methods.

Implementations may include one or more of the following features. The computer program product where the message suggests that the vehicle stop driving immediately. The computer program product where the message suggests that the vehicle be serviced by a technician. The computer program product where the accommodation includes throttling a future data load placed on the supervised component. The computer program product where the accommodation includes stopping an operation of a function that would result in an increase in the data load for the supervised component. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1A:
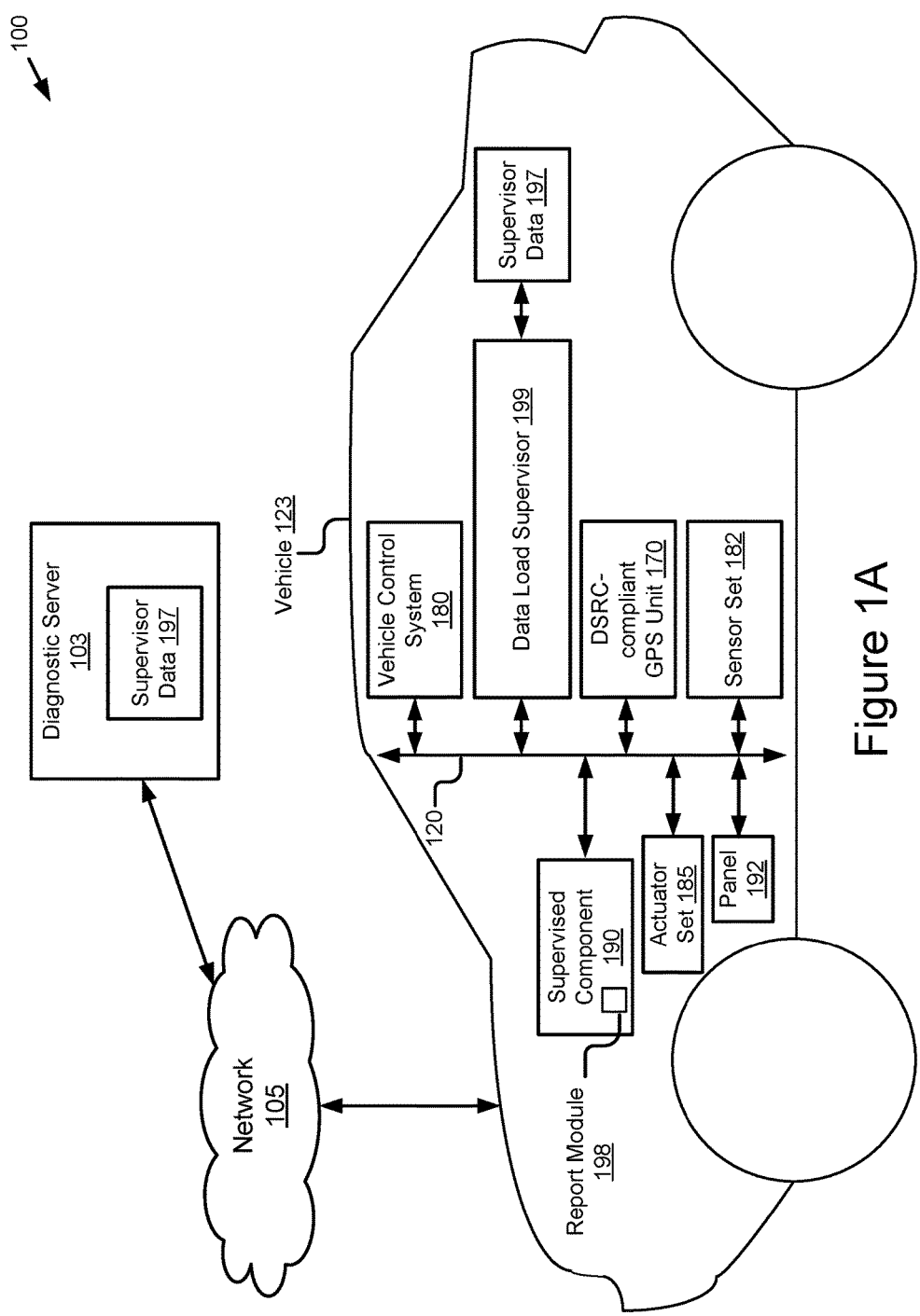
FIG. 1A is a block diagram illustrating an operating environment for a vehicle including a data load supervisor according to some implementations.

An automotive system may include a vehicle. Vehicles increasingly include vehicle control systems. For example, a vehicle may be an autonomous vehicle or include an Advanced Driver Assistance System (herein an "ADAS system"). More and more functions for autonomous driving or ADAS systems will be deployed in vehicles in the future. These functions will generate large amounts of computation and communication data loads for automotive components.

Examples of automotive components that are affected by functions for vehicle control systems may include one or more of the following: an Electronic Control Unit (herein "ECUs" if plural or "ECU" if singular), a bus, a switch, and a gateway.

The data loads resulting from the functions for automotive control systems may be dynamic. For example, these data loads may increase or decrease depending on different variables. Examples of variables that cause dynamic data loads may include one or more of the following: variable lighting conditions (e.g., daytime versus nighttime, clouds that block light, buildings that block light, trees that block lights, etc.); variable vehicle speed; variable roadway surface friction; variable traffic volume; and unpredictable driving behavior of other vehicles or other variable traffic conditions.

As a result of these large or dynamic data loads, it may be difficult for automotive systems to handle functions for vehicle control systems. This difficulty may result in serious safety or security concerns.

In some implementations, a data load supervisor may be designed to collect load data that describes the data loads for one or more vehicle components. The vehicle components may be communicatively coupled to the data load supervisor and operable to transmit or report their load data to the data load supervisor.

Load data may be described herein as "load information." Load data may include information describing, for example, one or more of the following: a number of applications of an ECU, an onboard vehicle computer or a sensor; and the data rates of these applications. From the perspective of a network-enabled device or a network itself, the load data may include one or more of the following: a number of messages transmitted or received; a size of the messages transmitted or received; and the data rates (e.g., bits/second, bits/millisecond, bits/microsecond, bits/nanosecond, etc.) for the messages that are transmitted or received.

In some implementations, a supervised component may include any vehicle component that includes a report module (described herein) and is supervised by a data load supervisor of the vehicle. For example, a supervised component may include any vehicle component that transmits or reports its load data to the data load supervisor.

In some implementations, one or more of the following elements may be examples of a supervised component: an electronic control unit; an onboard vehicle computer; a sensor; a network (e.g., Dedicated Short Range Communication, full-duplex wireless communication or messaging, Wi-Fi™, Bluetooth™ or any Bluetooth™ derivative, a Virtual Private Network, a mobile data network such 3G, 4G, LTE, VoIP, and etc.); and a network-enabled device (e.g., a vehicle component that includes any hardware or software necessary to send or receive messages via the network).

In some implementations, each supervised component includes a report module as described herein. The report module may include code and routines that are operable to provide load data associated with the supervised component to the data load supervisor that supervises the supervised component.

The data load supervisor may analyze the data loads and determine whether the supervised components can handle the data loads (e.g., whether the supervised component is operating within their specification) without an accommodation provided by the data load supervisor accommodate the system depending on its analysis and evaluation.

In some implementations, an accommodation may include, for example, one or more of the following: stopping an operations of a device (e.g., engine) or a supervised component (e.g., an ECU, sensor, etc.); stopping one or more tasks being executed by a supervised component (e.g., stopping a task of an ECU or onboard vehicle computer); rejecting an increase of task data rate for a supervised component (e.g., an increase in a number of tasks performed by an ECU or onboard computer, an increase in a sampling rate for a sensor); and rejecting an increase of message data rate for a supervised component (e.g., an increase in a number of messages received or transmitted by a network-enabled device, an increase in the size of a message transmitted by a network-enabled device).

In some implementations, an accommodation may include, for example, one or more of the following: data load throttling; data buffering (e.g., to relieve long term data load or to relieve peak data loads that exceed a limit described by the specification for the component); causing the vehicle or the subsystem including the supervised component to be shut down or restarted (e.g., by providing a graphical user interface ("GUI" if singular or "GUIs" if plural) including a warning to a driver of the vehicle, by providing a signal to an ECU that controls operation of the supervised component or the subsystem including the supervised component, etc.).

In some implementations, one or more of the supervised components may be designed, configured or specially manufactured to provide their load data to the data load supervisor. For example, the supervised component may be manufactured to include a report module as described herein. The supervised components may be operable to provide the load data to the data load supervisor using a specified format that is known to the supervised component and the data load supervisor. In this way, the data load supervisor may be able to analyze and quantify the load data. The data load supervisor may include a non-transitory memory that stores data describing the maximum short term or long term data loads for each supervised component that it supervises.

In some implementations, the data load supervisor may communicate with one or more supervised components via a wired communicative coupling, a wireless communicative coupling or a combination or a wired and wireless communication. The wired communicative coupling may include, for example, one or more of the following: a bus; a data signal line; an electrical wire; etc. The wireless communicative coupling may include, for example, one or more of the following: Wi-Fi; Bluetooth; Bluetooth Low Energy (LE); 3G; 4G; LTE; Dedicated Short Range Communication (DSRC) in which each of a supervised component and the data load supervisor include a DSRC receiver and transceiver; full-duplex wireless communication (or messaging) in which each of the supervised component and the data load supervisor include a full-duplex coordination system as described in U.S. patent application Ser. No. 14/471,387 filed on Aug. 28, 2014 and entitled "Full-Duplex Coordination System," the entirety of which is herein incorporated by reference; and a combination of one or more different wireless communication techniques described herein or any derivative or fork thereof. In some implementations, the wireless messages communicated between the supervised component and the data load supervisor may be secured via encryption or a virtual private network tunnel established between the supervised component and the data load supervisor.

In some implementations, a network device or an ECU can also be designed to provide the load data to the data load supervisor and receive an accommodation from the data load supervisor via a wired communicative coupling, a wireless communicative coupling or a combination of wired and wireless communication.

In some implementations, the selection between wired and wireless communications may be decided at design time based on one or more of the following: criticality of the communication; cost of the communicative coupling; and the wiring weight of the communicative coupling.

In some implementations, the data load supervisor may be communicative coupled to one or more supervised components and the data load supervisor may determine which form of communication to use (wired or wireless) on the fly or in real time (or substantially real time) based on the criticality of the message.

In some implementations, the data load supervisor may receive the load data and respond to the load data in real time or substantially real time.

In some implementations, the data load supervisor may perform or control performance of the operation of one or more of the following steps for each supervised component supervised by the data load supervisor: (1) collecting load data; (2) analyzing the load data; (3) evaluating one or more of the feasibility, safety, performance, reliability and security implications of the load data (and the latency resulting from the data load) relative to the specification of the component, the vehicle subsystem that includes the component or the overall vehicle as a system; (4) accommodating the supervised component so that it may process the data load described by the load data; (5) determine a vehicle state based on the load data for one or more supervised components; (6) output one or more GUIs to a panel of the vehicle that displays a message for a driver of the vehicle, wherein the message describes the vehicle state; and (7) store supervisor data in a non-transitory memory of the vehicle that describes one or more of the load data, vehicle state and driver response to the GUI describing the vehicle state.

One example benefit of the data load supervisor is that it may beneficially provide real-time status and warning messages to drivers if there is any feasibility, safety, performance, reliability, or security concern.

Another example benefit of the data load supervisor is that it may beneficially store supervisor data that may assist an automotive technician or vehicle designer to optimize the settings for the vehicle or the design for the vehicle.

Yet another example benefit of the data load supervisor is that it may beneficially protect drivers from unsafe situations and help to reduce the legal or financial liability for original equipment manufacturers (OEMs) that may result from functions with dynamic and large amount of data loads.

Example Overview

FIG. 1A is a block diagram illustrating an operating environment 100 for a vehicle 123 including a data load supervisor 199 according to some implementations.

The operating environment 100 may include one or more of the following elements: a vehicle 123; and a diagnostic server 103. These elements of the operating environment 100 may be communicatively coupled to a network 105.

The vehicle 123 may include a car, a truck, a sports utility vehicle, a bus, a semi-truck, a drone or any other roadway-based conveyance that includes a vehicle control system 180. In some implementations, the vehicle 123 may include an autonomous vehicle or a semi-autonomous vehicle.

The vehicle 123 may include one or more of the following elements: a supervised component 190; an actuator set 185; a panel 192; a vehicle control system 180; a data load supervisor 199; a DSRC-compliant GPS unit 170; and a sensor set 182. These elements may be communicatively coupled to one another via a bus 120. The vehicle 123 may further include a non-transitory memory (not pictured) that stores one or more of the following elements: supervisor data 197; the vehicle control system 180; and the data load supervisor 199.

In some implementations, the supervised component 190 may include the vehicle component which is supervised by the data load supervisor 199. For example, the supervised component may include one or more of the following vehicle components: an ECU; and onboard vehicle computer; a vehicle component that includes hardware or software that enable the vehicle component to communicate with the network 105 (i.e., a "network-enabled component").

In some implementations, the supervised component 190 may be specially manufactured, designed or configured to provide load data to the data load supervisor 199. For example, the supervised component 190 may include a report module 198. The report module 198 may include code and routines that are operable, when executed by a processor of the supervised component 190 or an onboard vehicle computer, to (1) build a set of load data and (2) provide the load data to the data load supervisor 199 via wired or wireless communication with the data load supervisor 199.

The load data may include information that describes the data load for the supervised component 190 for a particular time frame. The report module 198 may monitor the data load for the supervised component 190 over the particular time frame and build the set of load data that describes the data load for the supervised component 190 over that particular time frame. The load data may describe the current, real time or substantially real time data load for the supervised component 190. The report module 198 may build the set of load data in accordance with a standardized data format known to the supervised component 190 and the data load supervisor 199.

In some implementations, the set of load data may be stored by the data load supervisor 199 in the supervisor data 197.

In some implementations, only supervised components 190 of the vehicle 123 include the report module 198. The supervised component 190 may be specially manufactured, designed or configured to include the report module 198. In this way, supervised components 190 are not the same as ECUs, onboard vehicle computers or network-enabled components of other vehicles 123 or non-supervised vehicle components.

In some implementations, the supervised component 190 or the report module 198 may be communicatively coupled to the bus 120.

The actuator set 185 may include one or more vehicle actuators. In some implementations, the supervised component 190 may include an ECU that operates or controls the operation of the actuator set 185.

An actuator may include any vehicle component that includes a motor that is responsible for moving or controlling a mechanism or system of the vehicle 123.

Examples of actuators that may be included in the actuator set 185 may include one or more of the following: a capacitive actuator; a digital micro-mirror device; an electric motor; a hydraulic cylinder; a piezoelectric actuator; a pneumatic actuator; and a servomechanism.

In some implementations, the actuator set 185 may be communicatively coupled to the bus 120.

The panel 192 may include an electronic display panel or monitor of the vehicle 123. For example, the panel 192 may include an electronic display panel of a head-unit or heads-up display unit of the vehicle 123.

The heads-up display unit may include a three-dimensional heads-up display unit such as the one described in U.S. patent application Ser. No. 15/080,433 filed on Mar. 24, 2016 and entitled "Wireless Data Sharing Between a Mobile Client Device and a Three-Dimensional Heads-Up Display Unit," the entirety of which is herein incorporated by reference.

The data load supervisor 199 may generate graphical data for causing the panel 192 to display a GUI that displays a message or warning for a human driver of the vehicle 123. In some implementations, the panel 192 may be communicatively coupled to the bus 120.

The vehicle control system 180 may include an ADAS system of the vehicle 123. In some implementations, the vehicle control system 180 may include the software or hardware that causes the vehicle 123 to be an autonomous vehicle or semi-autonomous vehicle. In some implementations, the vehicle control system 180 may be communicatively coupled to the bus 120.

The data load supervisor 199 may include code and routines that are operable to perform one or more of the following steps: receive the load data from the supervised component 190; analyze the load data by comparing the load data to the specification for the supervised component or the vehicle 123 to determine if the data load exceeds some threshold described by the specification or a designer of the data load supervisor 199; determine whether the data load supervisor 199 can mitigate the data load by providing an accommodation; determine a vehicle state based on the data load and the availability or feasibility of an accommodation; generate graphical data based on the vehicle state; and cause the panel 192 to display a GUI that describes the vehicle state based on the graphical data.

The data load supervisor 197 may generate the supervisor data 197 based on the load data, the availability of an accommodation, the effect of an accommodation on a data load for a supervised component and the effect of a GUI on a driver (e.g., how the driver responded or failed to respond to a GUI). The supervisor data 197 may be provided to a representative of the manufacturer of the vehicle 123. For example, the supervisor data 197 may be provided to a vehicle technician or a vehicle designer via a direct interface with an onboard vehicle computer of the vehicle 123 or via a wireless uploading of the supervisor data 197 to the diagnostic server 103 via the network 105.

The data load supervisor 199 is described in more detail below with reference to FIGS. 1B, 2A, 2B, 3, 4A, 4B and 5.

In some implementations, the data load supervisor 199 may be implemented using hardware including a field-programmable gate array ("FPGA") or an application-specific integrated circuit ("ASIC"). In some other implementations, the data load supervisor 199 may be implemented using a combination of hardware and software. The data load supervisor 199 may be stored in a combination of the devices (e.g., servers or other devices), or in one of the devices.

The data load supervisor 199 is described in more detail below with reference to FIGS. 1B, 2A, 2B, 3, 4A, 4B and 5.

The DSRC-compliant GPS unit 170 may include hardware that wirelessly communicates with a GPS satellite to retrieve GPS data that describes a location of the vehicle 123. In some implementations, a DSRC-compliant GPS unit 170 is operable to provide GPS data that describes the location of the vehicle 123 to a lane-level degree of precision. The DSRC standard requires that GPS data be precise enough to infer if two vehicles (such as vehicle 123 and another vehicle on the same roadway as the vehicle 123) are in the same lane. The DSRC-compliant GPS unit 170 may be operable to identify, monitor and track its two-dimensional position within 1.5 meters of its actual position 68% of the time under an open sky. Since lanes of a roadway are typically no less than 3 meters wide, whenever the two dimensional error of the GPS data is less than 1.5 meters the data load supervisor 199 may analyze the GPS data provided by the DSRC-compliant GPS unit 170 and determine what lane of the roadway the vehicle 123 is traveling in based on the relative positions of vehicles on the roadway (or in the drive-through). The lane of the vehicle 123 may affect the determination of the vehicle state. For example, if the vehicle 123 is present on a high-speed roadway in a fast lane then then the vehicle state may be more critical. In another example, the GPS data may further describe a velocity of the vehicle 123 and this may affect the vehicle state as well. For example, faster velocities may correspond to a higher degree of criticality.

In some implementations, the sensor set 182 may include one or more sensors. The sensor set 182 may collect sensor data (see, e.g., sensor data 296 depicted in FIG. 2A). The sensor data may describe, for example, a performance of a vehicle actuator included in the actuator set 185 at a plurality of different times.

In some implementations, the sensor set 182 may include one or more sensors that are operable to measure the physical environment outside of the vehicle 123. For example, the sensor set 182 may record one or more physical characteristics of the physical environment that is proximate to the vehicle 123.

In some implementations, the sensor set 182 may include one or more of the following vehicle sensors: a camera; a LIDAR sensor; a laser altimeter; a navigation sensor (e.g., a global positioning system sensor of the DSRC-compliant GPS unit 170); an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor.

The sensor set 182 may be operable to record sensor data that describes one or more locations of the vehicle 123 at one or more different times, images or other measurements of the vehicle environment and objects or other vehicles present in the vehicle environment, etc. The vehicle environment may include the area outside of the vehicle 123 that is proximate to the vehicle 123. For example, the vehicle 123 may be in motion on a roadway and the vehicle environment may include other vehicles that are in front of the vehicle 123, behind the vehicle 123, beside the vehicle 123 or one or more car lengths away from the vehicle 123. The sensor data may be included in the supervisor data 197.

In some implementations, the sensor data may be used to determine the vehicle state. For example, if the sensor data includes images or other data that indicates that the vehicle 123 is present around other vehicles or other obstacles which may be struck by the vehicle 123 due in part to a failure of the supervised component 190 due to a data overload or data fault, then the data load supervisor 199 may determine that the vehicle state is more critical.

Figure 5:
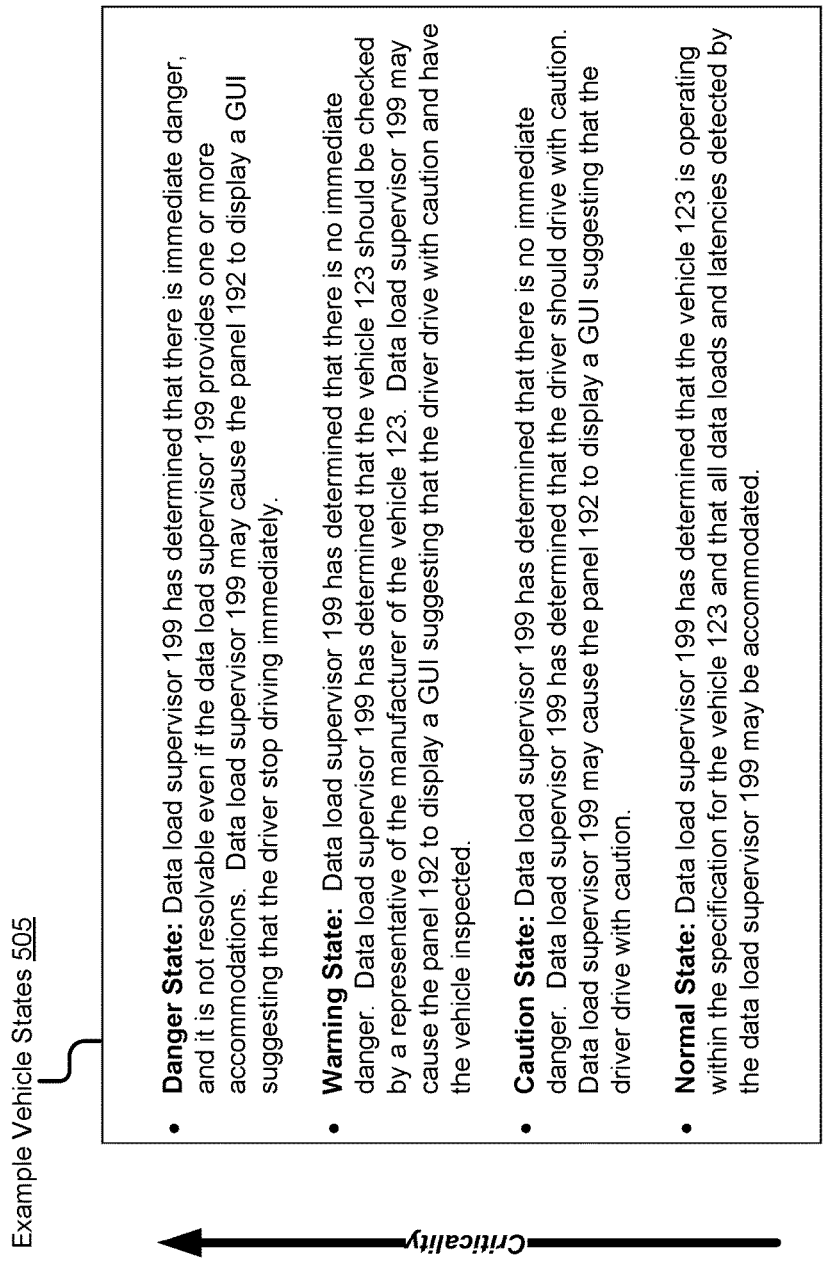
FIG. 5 is a block diagram illustrating an example of candidate vehicle states according to some implementations.

Examples of the vehicle state are depicted in FIG. 5, wherein vehicle states of higher degree of criticality are listed towards the top of the FIG. 5.

Referring now back to FIG. 1A. Although not depicted in FIG. 1A, in some implementations the vehicle 123 may include a full-duplex coordination system as described in U.S. patent application Ser. No. 14/471,387 filed on Aug. 28, 2014 and entitled "Full-Duplex Coordination System," the entirety of which is herein incorporated by reference.

The vehicle 123 may be communicatively coupled to the network 105. The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some implementations, the network 105 may include a peer-to-peer network. The network 105 may also be coupled to or may include portions of a telecommunications network for sending data in a variety of different communication protocols. In some implementations, the network 105 includes Bluetooth communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, etc. The network 105 may also include a mobile data network that may include third-generation (3G), fourth-generation (4G), long-term evolution (LTE), Voice-over-LTE ("VoLTE") or any other mobile data network or combination of mobile data networks. Further, the network 105 may include one or more IEEE 802.11 wireless networks.

In some implementations, the network 105 may include one or more communication channels shared among the vehicle 123 and one or more other wireless communication devices. The communication channel may include DSRC, full-duplex wireless communication or any other wireless communication protocol. For example, the network 105 may be used to transmit a DSRC message, DSRC probe or basic safety message to a vehicle 123.

The diagnostic server 103 may include a hardware server. The diagnostic server 103 may be communicatively coupled to the network 105. The diagnostic server 103 may include network communication capabilities. The diagnostic server 103 may be operable to send and receive messages via the network 105.

Figure 1B:
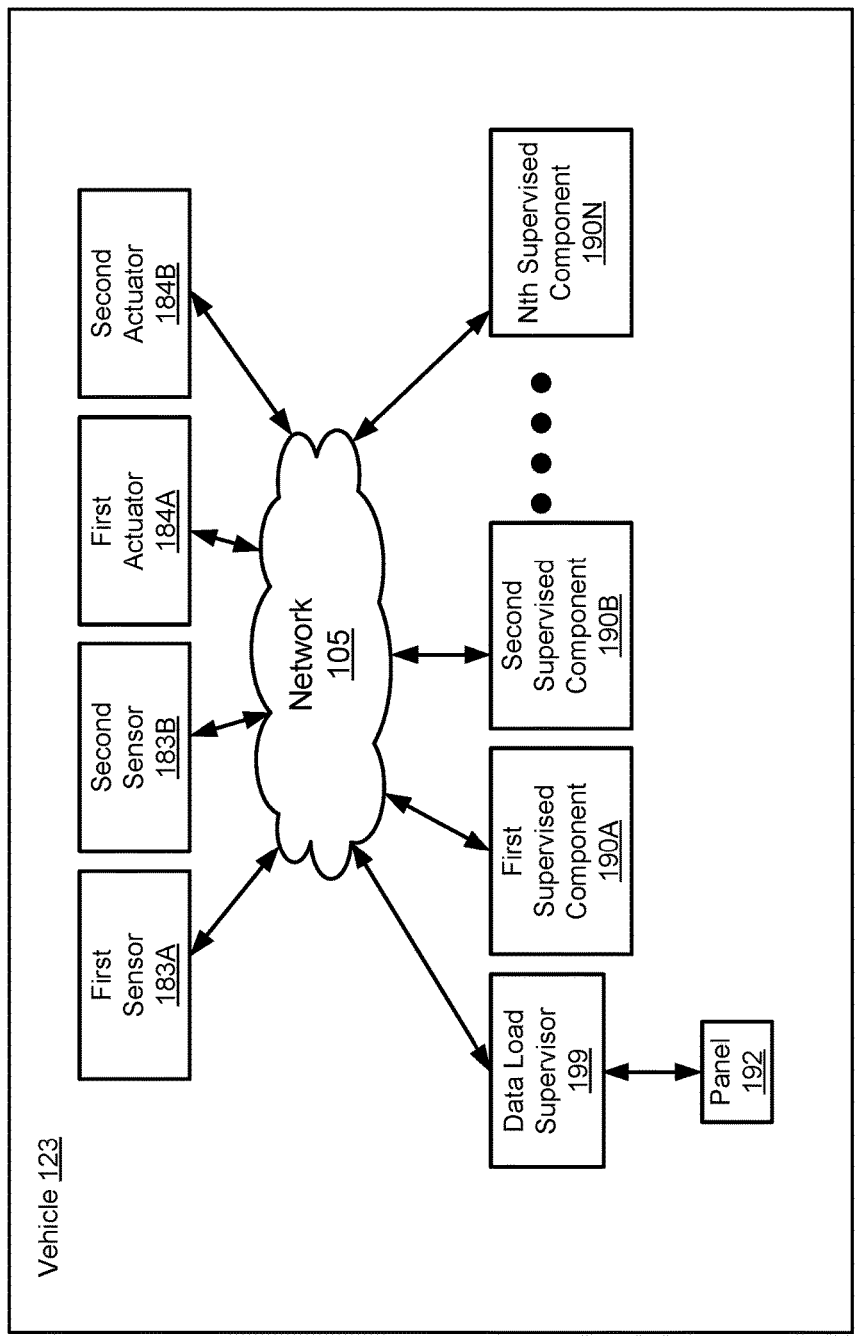
FIG. 1B is a block diagram illustrating a vehicle including a data load supervisor according to some implementations.

In some implementations, the vehicle 123 may provide the supervisor data 197 to the diagnostic server 103 via the network 105. A technician or vehicle designer may then access the supervisor data 197 to modify the vehicle 123 or a vehicle design Referring now to FIG. 1B, depicted is a block diagram illustrating a vehicle 123 including a data load supervisor 199 according to some implementations. FIG. 1B may depict an implementation of the data load supervisor 199 where one or more of the elements of the vehicle 123 communicate with one another via a wireless communicative coupling such as the network 105.

The vehicle 123 may include one or more of the following elements: a first sensor 183A; a second sensor 183B; a first actuator 184A; a second actuator 184B; the data load supervisor 199; the panel 192 communicatively coupled to the data load supervisor 199; a first supervised component 190A; a second supervised component 190B; and an Nth supervised component 190N (wherein the "N" indicates that the data load supervisor 199 may supervise any positive number of supervised components 190). These elements of the vehicle 123 are network-enabled and communicatively coupled to one another via a network 105. In other words, one or more elements of the vehicle 123 itself may be communicatively coupled to one another via a network 105.

The network 105 was described above with reference to FIG. 1A, and so, that description will not be repeated here. In the implementation depicted in FIG. 1B the network 105 may be configured so that it is private to the elements of the vehicle 123. For example, the network 105 may be encrypted using a key known to these elements of the vehicle 123. In another example, the network 105 may include a virtual private network shared among these elements of the vehicle 123.

In some implementations, the network 105 may enable DSRC or full-duplex wireless communication among two or more elements of the vehicle 123.

In some implementations, one or more of the elements of the vehicle 123 may be communicatively coupled to a second network 105 that is external to the vehicle 123 as shown in FIG. 1B.

The panel 192 and data load supervisor 199 were described above with reference to FIG. 1B, and so, those descriptions will not be repeated here.

The first supervised component 190A, second supervised component 190B and Nth supervised component 190N may include similar functionality as the supervised component 190 described above with reference to FIG. 1A, and so, that description will not be repeated here. For example, the first supervised component 190A may include an ECU, the second supervised component 190B may include an onboard vehicle computer and the third supervised component 190N may include a network-enabled vehicle component (e.g., a head-unit, infotainment system, navigation system, heads-up display unit, etc.).

The first sensor 183A and the second sensor 183B may include sensors that are elements of the sensor set 182 described above with reference to FIG. 1A. Accordingly, the first sensor may include one of the sensors described above for the sensor set 182. Similarly, the second sensor 183B may include one of the sensors described above for the sensor set 182.

The first actuator 184A and the second actuator 184B may include actuators that are elements of the actuator set 185 described above with reference to FIG. 1A. Accordingly, the first actuator 184A may include one of the actuators described above for the actuator set 185. Similarly, the second actuator 184B may include one of the actuators described above for the actuator set 185.

Figure 2A:
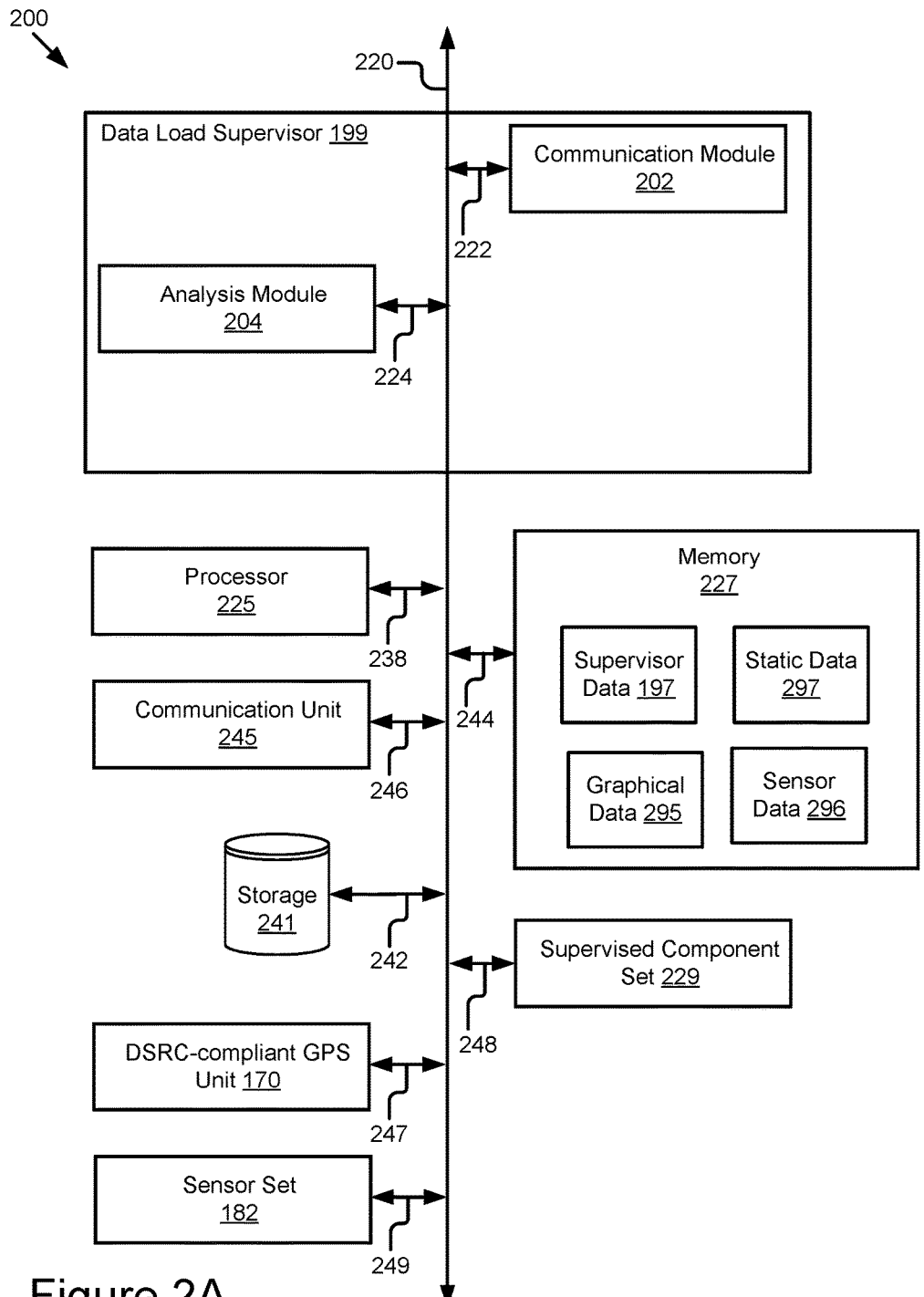
FIG. 2A is a block diagram illustrating an example computer system including a data load supervisor according to some implementations.

Referring now to FIG. 2A, depicted is a block diagram illustrating an example computer system 200 including a data load supervisor 199 according to some implementations.

In some implementations, the computer system 200 may include a special-purpose computer system that is programmed to perform one or more steps of a method 300 described below with reference to FIG. 3.

In some implementations, the computer system 200 may include the vehicle 123.

In some implementations, the computer system 200 may include an onboard vehicle computer of the vehicle 123. In some implementations, the computer system 200 may include an electronic control unit, head unit or some other processor-based computing device of the vehicle 123.

The computer system 200 may include one or more of the following elements according to some examples: the data load supervisor 199; a processor 225; a communication unit 245; the sensor set 182; the DSRC-compliant GPS unit 170; a storage 241; a supervised component set 229; and a memory 227. The components of the computer system 200 are communicatively coupled by a bus 220.

In the illustrated implementation, the processor 225 is communicatively coupled to the bus 220 via a signal line 238. The communication unit 245 is communicatively coupled to the bus 220 via a signal line 246. The sensor set 182 is communicatively coupled to the bus 220 via a signal line 249. The DSRC-compliant GPS unit 170 is communicatively coupled to the bus 220 via a signal line 247. The supervised component set 229 is communicatively coupled to the bus 220 via a signal line 248. The storage 241 is communicatively coupled to the bus 220 via a signal line 242. The memory 227 is communicatively coupled to the bus 220 via a signal line 244.

The sensor set 182 and the DSRC-compliant GPS unit 170 were described above with reference to FIG. 1A, and so, those descriptions will not be repeated here.

The supervised component set 229 may include one or more supervised components 190 that are supervised by the same data load supervisor 199. For example, in FIG. 1B the first supervised component 190A, the second supervised component 190B and the Nth supervised component 190N may include elements of the supervised component set 229.

The processor 225 includes an arithmetic logic unit, a microprocessor, a general purpose controller, or some other processor array to perform computations and provide electronic display signals to a display device. The processor 225 processes data signals and may include various computing architectures including a complex instruction set computer (CISC) architecture, a reduced instruction set computer (RISC) architecture, or an architecture implementing a combination of instruction sets. Although FIG. 2A includes a single processor 225, multiple processors may be included. The processor 225 may include a graphical processing unit. Other processors, operating systems, sensors, displays, and physical configurations may be possible.

The memory 227 stores instructions or data that may be executed by the processor 225. The instructions or data may include code for performing the techniques described herein. The memory 227 may be a dynamic random access memory (DRAM) device, a static random access memory (SRAM) device, flash memory, or some other memory device. In some implementations, the memory 227 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

As illustrated in FIG. 2, the memory 227 stores one or more of the following elements: the supervisor data 197; static data 297; graphical data 295; and sensor data 296. The supervisor data 197 was described above with reference to FIGS. 1A and 1B, and so, that description will not be repeated here.

The static data 297 may describe static load information that describes the static data load for the elements of the supervised component set 229. In this way, the load data need only describe the dynamic data load for the elements of the supervised component set 229 and not the static data load for these elements.

In some implementations, the static data 297 may include data that describes an encryption key for decoding a wireless message received from the elements of the supervised component set 229.

In some implementations, the static data 297 may describe a specification for the elements of the supervised component set 229 or the vehicle 123. The specification may describe the data load tolerances or thresholds for the supervised components 190 individually or collectively working together as a system.

The graphical data 295 may include graphical data for causing a panel 192 to display a GUI. The graphical data 295 may be generated by the data load supervisor 199 at run time or preloaded to the memory 227 at design time.

The sensor data 296 may include data describing one or more physical measurements collected by one or more sensors of the sensor set 182. The sensor data 296 may include GPS data received, generated or provided by the DSRC-compliant GPS unit 170.

The communication unit 245 may include hardware that transmits and receives data to and from the network 105. In some implementations, the communication unit 245 includes a port for direct physical connection to the network 105 or to another communication channel. For example, the communication unit 245 includes a USB, SD, CAT-5, or similar port for wired communication with the network 105. In some implementations, the communication unit 245 includes a wireless transceiver for exchanging data with the network 105 or other communication channels using one or more wireless communication methods, including IEEE 802.11, IEEE 802.16, Bluetooth, or another suitable wireless communication method.

In some implementations, the communication unit 245 includes a port for direct physical connection to the network 105 or to another communication channel. For example, the communication unit 245 includes a USB, SD, CAT-5, or similar port for wired communication with the network 105.

In some implementations, the communication unit 245 includes a wireless transceiver for exchanging data with the network 105 or other communication channels using one or more wireless communication methods, including: IEEE 802.11; IEEE 802.16, Bluetooth; EN ISO 14906:2004 Electronic Fee Collection—Application interface EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471,387 filed on Aug. 28, 2014 and entitled "Full-Duplex Coordination System"; or another suitable wireless communication method.

In some implementations, the communication unit 245 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some implementations, the communication unit 245 includes a wired port and a wireless transceiver. The communication unit 245 also provides other conventional connections to the network 105 for distribution of files or media objects using standard network protocols including TCP/IP, HTTP, HTTPS, and SMTP, millimeter wave, DSRC, etc.

The storage 241 can be a non-transitory storage medium that stores data for providing the functionality described herein. The storage 241 may be a dynamic random access memory (DRAM) device, a static random access memory (SRAM) device, flash memory, or some other memory devices. In some implementations, the storage 241 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

Figure 2B:
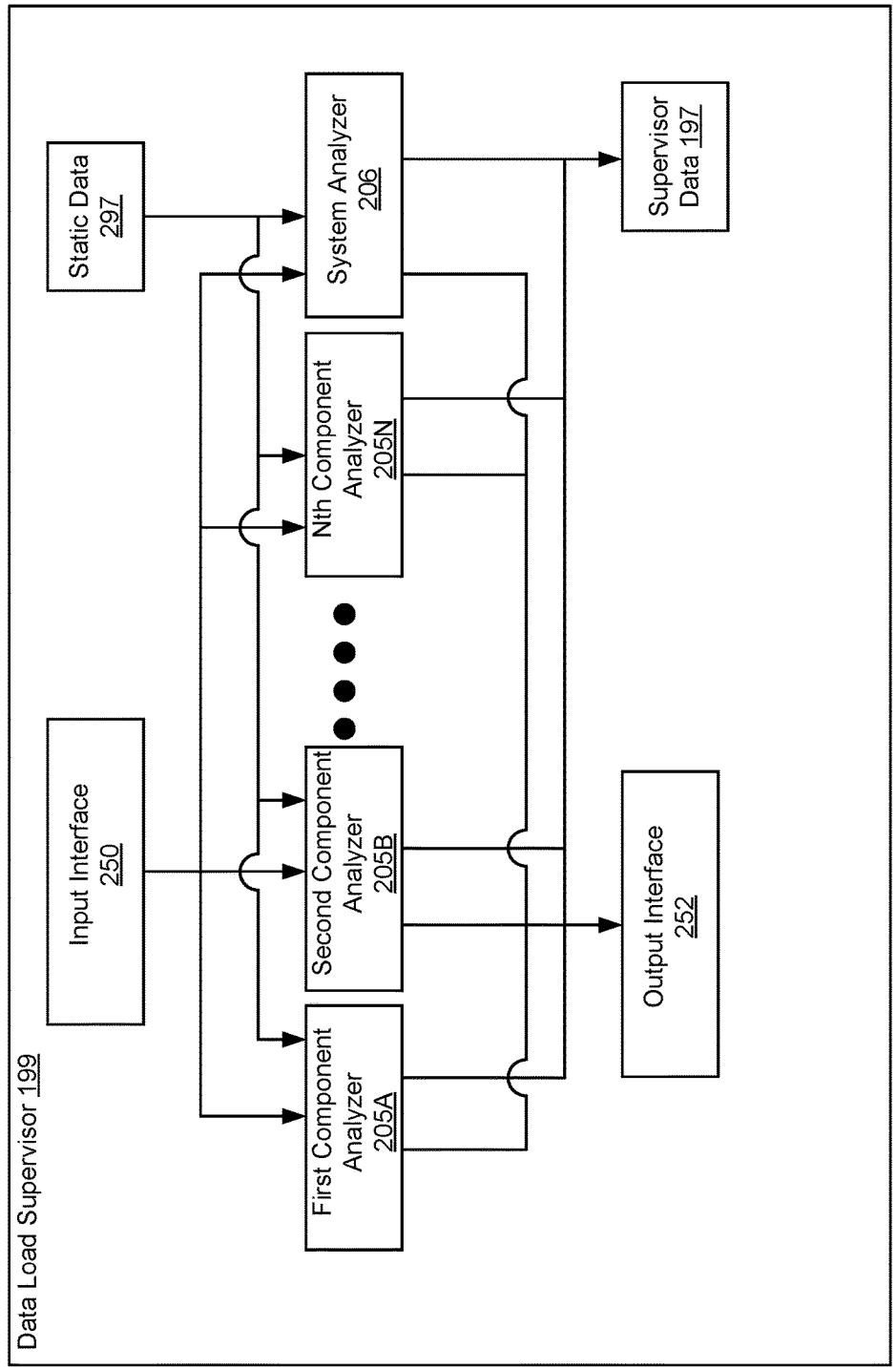
FIG. 2B is a block diagram illustrating an example data load supervisor according to some implementations.

In the illustrated implementation shown in FIG. 2A, the data load supervisor 199 includes a communication module 202 and an analysis module 204. These components of the data load supervisor 199 are communicatively coupled to each other via the bus 220. In some implementations, components of the data load supervisor 199 can be stored in a single server or device. In some other implementations, components of the data load supervisor 199 can be distributed and stored across multiple servers or devices. In some implementations, the data load supervisor 199 may include a set of analysis modules 204. The set of analysis modules 204 may include a plurality of analysis modules 204 as shown in FIG. 2B.

Referring back to FIG. 2A, the communication module 202 can be software including routines for handling communications between the data load supervisor 199 and other components of the computer system 200. In some implementations, the communication module 202 can be a set of instructions executable by the processor 225 to provide the functionality described below for handling communications between the data load supervisor 199 and other components of the computer system 200. In some implementations, the communication module 202 can be stored in the memory 227 of the computer system 200 and can be accessible and executable by the processor 225. The communication module 202 may be adapted for cooperation and communication with the processor 225 and other components of the computer system 200 via signal line 222.

The communication module 202 sends and receives data, via the communication unit 245, to and from one or more elements of the computer system 200 or the network 105. For example, the communication module 202 receives, via the communication unit 245, one or more of the following: load data describing a data load of a supervised component 190 included in the supervised component set 229.

In some implementations, the communication module 202 receives data from components of the data load supervisor 199 and stores the data in one or more of the storage 241 and the memory 227. For example, the communication module 202 receives the supervisor data 197 from the analysis module 204 and stores the supervisor data 197 in the memory 227.

In some implementations, the communication module 202 may handle communications between components of the data load supervisor 199 or the computer system 200.

The analysis module 204 can be software including routines for analyzing one or more of the load data, the static data 297 and the sensor data 296 to determine the supervisory data 197, the vehicle state and the graphical data 295. The communication module 202 may provide the graphical data 295 to the panel 192.

In some implementations, the analysis module 204 can be stored in the memory 227 of the computer system 200 and can be accessible and executable by the processor 225. The analysis module 204 may be adapted for cooperation and communication with the processor 225 and other components of the computer system 200 via signal line 224.

FIG. 2B is a block diagram illustrating an example data load supervisor 199 according to some implementations.

The data load supervisor 199 may include one or more of the following elements: an input interface 250; the static data 297; a first component analyzer 205A; a second component analyzer 205B; an Nth component analyzer 205N (wherein the "N" indicates that the data load supervisor 199 may include any positive whole number of component analyzers 205); a system analyzer 206; an output interface 252; and the supervisor data 197. The component analyzers 205 and the system analyzer 206 may be elements of the analysis module set 204 described above with reference to FIG. 2A.

The static data 297 and the supervisor data 197 were described above with reference to FIGS. 1A, 1B, and 2A, and so, these descriptions will not be repeated here.

The input interface 250 may include code and routines that are operable to cause a processor (such as the processor 225 described above for FIG. 2A) to receive one or more messages or other inputs. For example, the input interface 250 may receive an input from a bus (e.g., bus 120 or bus 220) or a network (e.g., network 105).

In some implementations, the input interface 250 may receive a message that includes one or more of the load data or the sensor data 296. For example, the input interface 250 may receive a message from a report module 198 of a supervised component 190. The message may be received via a network 105 or a bus 120. The message may include the load data for the supervised component 190.

In some implementations, the input interface 250 may be stored on a non-transitory memory such as the memory 227 or the storage 241 described above with reference to FIG. 2A.

In some implementations, the input interface 250 may include a hardware component that is hard wired to a main system network. The main system network may include a Controller Area Network (CAN) bus or an Ethernet switch.

In some implementations, the input interface 250 may include hardware such as a port or a receiver for a network. For example, the input interface may include one or more of the following: a DSRC receiver, a Wi-Fi receiver, a Bluetooth receiver, a mobile network receiver, a full-duplex coordination system, etc.

In some implementations, the input interface 250 may include a combination of hardware and software.

In some implementations, the input interface 250 may be an element of the communication unit 245 described above for FIG. 2A.

The output interface 252 may include code and routines that are operable to cause a processor (such as the processor 225 described above for FIG. 2A) to transmit messages or data to another element or device. For example, the output interface 252 may transmit graphical data 295 to a panel 192 to cause the panel to display a GUI.

In some implementations, the output interface 252 may be stored on a non-transitory memory such as the memory 227 or the storage 241 described above with reference to FIG. 2A.

In some implementations, the output interface 252 may be communicatively coupled to a panel 192 or a bus (e.g., bus 120) that is communicatively coupled to the panel 192.

In some implementations, the output interface 252 may include hardware such as a port or transceiver.

In some implementations, the output interface 252 may include a combination of hardware and software.

In some implementations, the output interface 252 may be an element of the communication unit 245 described above for FIG. 2A.

The component analyzers 205A, 205B, 205N and the system analyzer 206 (collectively referred to as "the analyzers 205, 206" or individually as "the component analyzer 205" or "the system analyzer 206," respectively) may include code and routines that are operable to cause a processor (such as the processor 225 described above for FIG. 2A) to analyze or evaluate one supervised component 190 or a whole system (e.g., each supervised component of a vehicle 123 or a subsystem of the vehicle 123 such as the navigation system, infotainment system, vehicle control system 180, etc. For example, a first component analyzer 205A may evaluate a single supervised component 190 whereas a system analyzer 206 may analyze a whole system.

In some implementations, the analyzers 205, 206 may analyze or evaluate the supervised component 190 or the whole system in real-time or substantially real time.

In some implementations, the analyzers 205, 206 may analyze load data and evaluate the load data for one or more of the following criteria: feasibility of a supervised component 190 or the whole system; safety of a supervised component 190 or the whole system; performance of a supervised component 190 or the whole system; reliability of a supervised component 190 or the whole system; and security of a supervised component 190 or the whole system.

In some implementations, a component analyzer 205 may analyze the load data for a supervised component 190 to determine one or more of the following: a utilization of each supervised component 190; a latency of each frame on a network-enabled device or each task performed by an ECU, sensor or onboard computer; a presence of one or more present or potential security attacks or vulnerabilities.

In some implementations, a system analyzer 206 may analyze the load data for two or more supervised components 190 of a system to determine one or more of the following for the system: an overall system data load; whether the overall system data load is balanced or substantially balanced; a degree of balance of the overall system data load; an overall latency of a series of frames and tasks (a functional path) for the system; and a system-level security analysis for the system associated with the system analyzer 206.

In some implementations, the overall system data load may include a sum or aggregate of the data load for each supervised component 190 included in the system associated with the system analyzer 206.

In some implementations, an overall system latency may include a sum or aggregate of the latencies resulting from the respective data loads for each supervised component 190 included in system.

In some implementations, an overall system data load may be balanced or substantially balanced if the individual data loads for the system are distributed among the supervised components 190 included in the system in proportion to a maximum or recommended data load for each of the supervised components 190 (as may be described by the specification for each of these supervised components 190). For example, exceeding a maximum or recommended data load for a specified period of time may cause an increased (e.g., exponential) latency for an individual supervised component 190 over a period of time in excess of the specified period of time.

In some implementations, an overall system data load may be balanced or substantially balanced if the individual data loads for the system are distributed among the supervised components 190 included in the system in a proportion that is configured or operational to maximize a data throughput for the system or a data load managed by the system within specification for the system or the individual supervised components 190 of the system.

Figure 3:
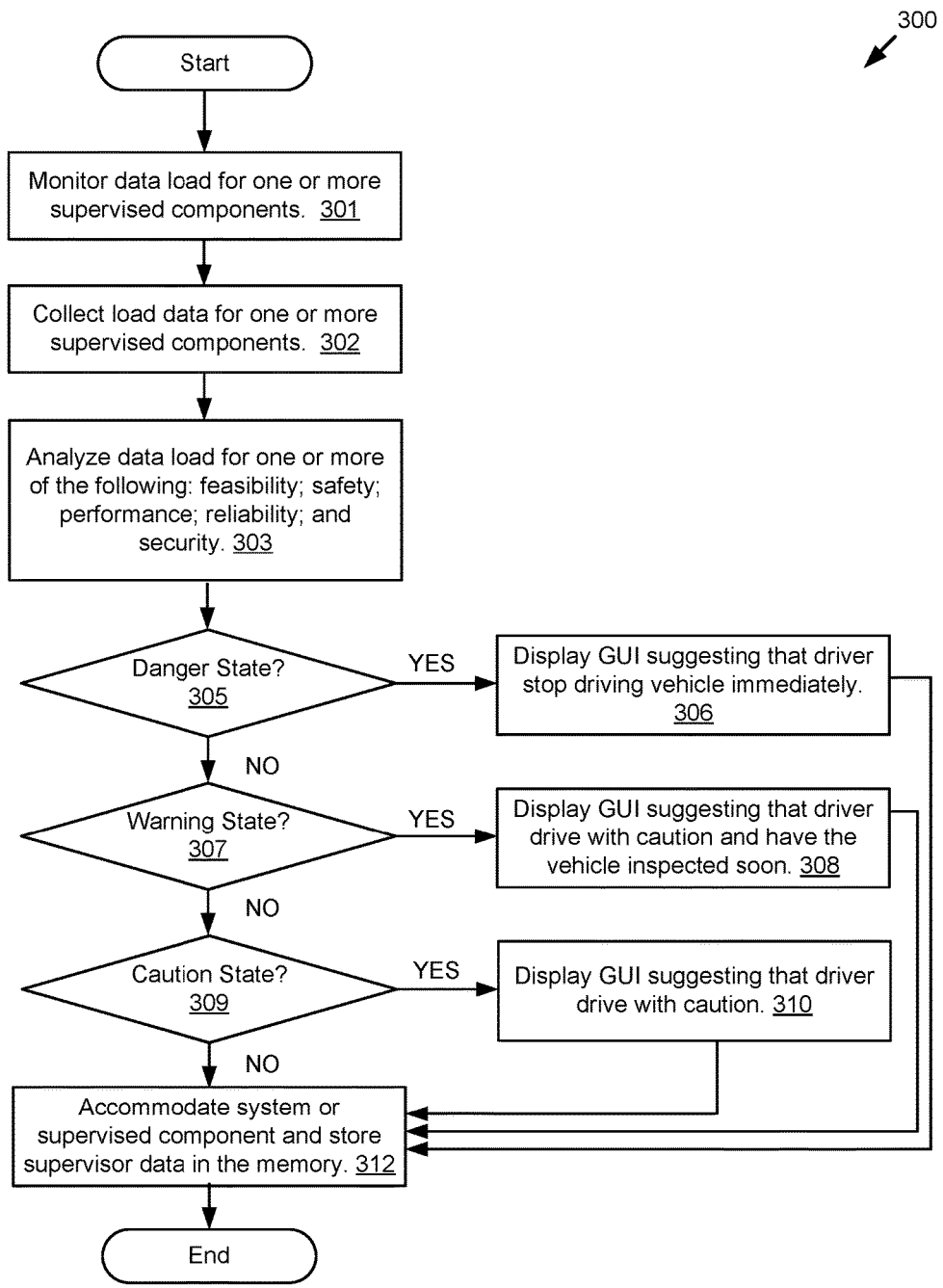
FIG. 3 is a flowchart of an example method for determining a vehicle state according to some implementations.

Referring now to FIG. 3, depicted is a flowchart of an example method 300 for determining a vehicle state according to some implementations. One or more of the steps described herein for the method 300 may be executed by a data load supervisor.

At step 301, a data load for one or more supervised components may be monitored. For example, a data load supervisor may monitor an input interface for a message including load data for a supervised component. The message may be received via a wired or a wireless interface.

At step 302, the load data for one or more supervised components may be collected. For example, the load data may be parsed from the message.

At step 303, the data load for the supervised component may be analyzed based on one or more of the following criteria: feasibility; safety; performance; reliability; and security.

At step 305, a determination may be made regarding whether the vehicle state is a danger state. An example implementation of a danger state is described in FIG. 5. If a determination is made that the vehicle state is a danger state, then the method 300 proceeds to step 306. At step 306 a GUI may be displayed. The GUI may include a graphical message that suggests that the driver stop driving the vehicle immediately. For example, the data load supervisor 199 may generate graphical data 295 for causing the panel 192 to display the GUI including the message. The data load supervisor 199 may provide the graphical data 295 to the panel 192. The panel 192 may display the GUI for the driver. The driver may view the panel. The data load supervisor 199 may record data describing how or whether the driver responds to the GUI. The method 300 may then proceed to step 312. If the vehicle state is not a danger state at step 305, then the method 300 may proceed to step 307.

At step 307, a determination may be made regarding whether the vehicle state is a warning state. An example implementation of a warning state is described in FIG. 5. If a determination is made that the vehicle state is a warning state, then the method 300 proceeds to step 308. At step 308 a GUI may be displayed. The GUI may include a graphical message that suggests that the driver drive with caution and have the vehicle inspected soon. The method 300 may then proceed to step 312. If the vehicle state is not a warning state at step 307, then the method 300 may proceed to step 309.

At step 309, a determination may be made regarding whether the vehicle state is a caution state. An example implementation of a caution state is described in FIG. 5. If a determination is made that the vehicle state is a caution state, then the method 300 proceeds to step 310. At step 310 a GUI may be displayed. The GUI may include a graphical message that suggests that the driver drive with caution. The method 300 may then proceed to step 312. If the vehicle state is not a caution state at step 309, then the method 300 may proceed to step 312.

At step 312 the system or the supervised component may be provided with an accommodation. Supervisor data describing one or more steps of the method 300 may be stored in a non-transitory memory.

Figure 4:
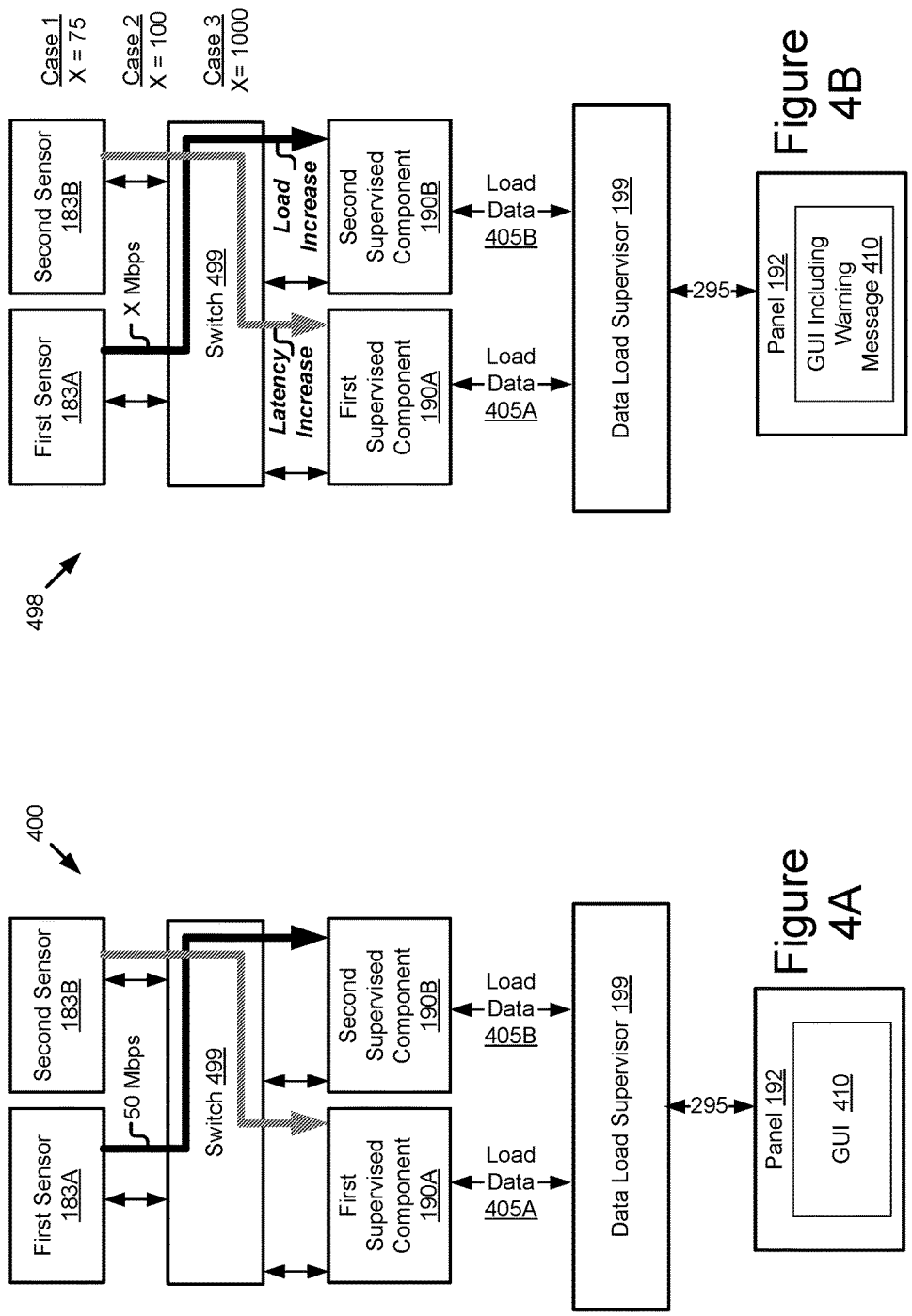
FIGS. 4A and 4B are block diagrams illustrating example use cases for a data load supervisor according to some implementations.

Referring now to FIGS. 4A and 4B, depicted are block diagrams illustrating example use cases 400, 498 for a data load supervisor 199 according to some implementations.

FIGS. 4A and 4B depict an example use case including a data load increase for a supervised component. For example, in FIG. 4A the first sensor 183A has a data load of 50 megabytes per second ("Mbps") but in FIG. 4B the data load for the first sensor 183A increases to X, where X is a variable that may be equal to 75 Mbps in Case 1, 100 Mbps in Case 2 or 1000 Mbps in Case 3.

In some implementations, if the first sensor 183A increases its data rate from 50 Mbps to 75, 100, or 1000 Mbps and sends the corresponding frames to a second supervised component 190B (e.g., a second ECU) through the switch 499, the loads of the second supervised component 190B and the switch 499 will increase and may cause different results, depending on the value of the data rate.

For example, assume that there is a constraint included in a specification that indicates that the switch 499 should have a data rate of at most 75 Mbps from the first sensor 183A. The three cases (i.e., Case 1, Case 2 and Case 3) are discussed as follows:

Case 1: X=75 Mbps

Referring to both FIGS. 4A and 4B, if the first sensor 183A increases its data rate from 50 Mbps (FIG. 4A) to 75 Mbps (FIG. 4B), the data load supervisor 199 may receive a message including the load data 405B for the first sensor 183A. The data load supervisor 199 may parse the load data 405B from the message. The load data 405B may describe the data rate for the first sensor 183A. The data load supervisor 199 may analyze the load data 405B. The data load supervisor 199 may verify the feasibility of the first sensor 183A because (1) the data rate from the first sensor 183A is 75 Mbps and (2) a constraint included in a specification for the first sensor 183A or the switch 499 indicates that the switch 499 should have a data rate of at most 75 Mbps from the first sensor 183A.

In some implementations, the data load supervisor 199 may output a caution message for the switch 499 as the data rate for the first sensor 183A is at the upper limit of the specification (i.e., the data rate for the first sensor 183A is 75 Mbps and the specification describes the upper limit as being 75 Mbps). For example, the data load supervisor 199 may generate graphical data 295 for a caution message. The data load supervisor 199 may provide the graphical data 295 to the panel 192. The panel 192 may display a GUI 410 based on the graphical data 295. The GUI 410 may include the caution message.

In some implementations, the data load supervisor 199 may provide an accommodation for the switch 499 or the first sensor 183A. For example, if a driver of the vehicle wants to execute some functions or increase the precisions (and thus the data rates) of one or more sensors associated with the switch 499 (e.g., the first sensor 183A or the second sensor 183B), the data load supervisor 199 may cause the first supervised component 190A (e.g., an ECU that controls the operation of the second sensor 183B) or the second supervised component 190B (e.g., an ECU that controls the operation of the first sensor 183A) to not execute the functions since doing so may result in the specification for the first sensor 183A or the switch 499 to be exceeded (e.g., X may exceed 75 Mbps). Accordingly, the accommodation may include one or more functions not being executed and the precisions of the first sensor 183A or the second sensor 183B not being increased in accordance with the driver's input to increase the precision of one or more sensors.

Case 2: X=100 Mbps

If the first sensor 183A increases its data rate from 50 Mbps to 100 Mbps, then the data load supervisor 199 may determine that operation of the first sensor 183A is not feasible because this data rate exceeds the specification for either the first sensor 183A, the switch 499 or a system or subsystem of the vehicle. The following are example scenarios of how the data load supervisor 199 may provide an accommodation responsive to (1) this resulting vehicle state and (2) a request from the driver to perform an additional, different or new function that results in greater data load (i.e., X>100 Mbps):

In a first example scenario, if the corresponding function is not safety-critical (for example, the video quality of an infotainment system is not increased as the driver's wish, but it is still safe), the data load supervisor may provide an accommodation that includes (1) throttling the data rate for X back to 75 Mbps (or substantially 75 Mbps) and (2) causing a panel 192 to display a caution message.

In a second example scenario, if the corresponding function is not safety-critical but problematic (for example, the data rate of for the first sensor 183A is out of its normal range as indicated by its specification), the data load supervisor 199 may provide an accommodation that includes (1) throttling the data rate for X back to 75 Mbps (or substantially 75 Mbps) and (2) causing a panel 192 to display a warning message. The driver should drive with caution and have an inspection soon.

In the third example scenario, if the corresponding function is safety-critical (for example, an important control function), the data load supervisor 199 may cause a panel 192 to display a caution message. If the vehicle is an autonomous vehicle, the data load supervisor 199 may provide a message to the control software for the autonomous vehicle to cause the autonomous vehicle to safely pull into a breakdown lane and power down the vehicle.

Case 2: X=100 Mbps

If the first sensor 183A increases its data rate from 50 Mbps to 1000 Mbps, the data load supervisor may identify it as a Denial-of-Service (DoS) attack and cause the panel 192 to display a danger message. The driver should stop driving immediately. If the vehicle is an autonomous vehicle, the data load supervisor 199 may provide a message to the control software for the autonomous vehicle to cause the autonomous vehicle to safely pull into a breakdown lane and power down the vehicle.

For each of the cases described above, the data load supervisor 199 may write supervisor data 197 to a non-transitory memory that describes the events. During vehicle inspection or servicing, an automotive technician may retrieve the supervisor data 197 and optimize the system settings based on the supervisor data 197.

In some implementations, supervisor data 197 from different vehicles may be combined and provided to vehicle designers who may optimize a future system design our cause a patch to be downloaded to correct a design problem indicated by the aggregated supervisor data 197.

FIG. 5 is a block diagram illustrating an example of candidate vehicle states 505 according to some implementations.

A danger state may be more critical than a warning state. A warning state may be more critical than a caution state. A caution state may be more critical than a normal state.

Referring now to FIG. 1A, one or more of the following devices may be a communication device: a vehicle 123; a diagnostic server 103. Referring now to FIG. 1B, one or more of the following elements may be a communication device: a first sensor 183A; a second sensor 183B; a first actuator 184A, a second actuator 184B; a data load supervisor 199; a first supervised component 190A; a second supervised component 190B; an Nth supervised component 190N. Regarding U.S. patent application Ser. No. 14/471, 387 filed on Aug. 28, 2014 and entitled "Full-Duplex Coordination System," in a half-duplex communication system, a first communication device currently transmitting data to a second communication device is not capable of simultaneously receiving data from the second communication device. If the second communication device has data to transmit to the first communication device, the second communication device needs to wait until the first communication device completes its data transmission. Only one communication device is allowed to transmit data at one time in the half-duplex communication system.

In a standard IEEE 802.11 Wireless Local Area Network (WLAN), communication devices may compete for access to a wireless channel based on the Carrier Sense Multiple Access with Collision Avoidance (CSMA/CA) Medium Access Control (MAC) protocol. The IEEE 802.11 MAC protocol requires that only one communication device may use the wireless channel to transmit data at one time. If two or more communication devices transmit data over the wireless channel at the same time, a collision occurs. As a result, only the communication device that currently gains access to the wireless channel may use the wireless channel to transmit data. Other communication devices having data to transmit need to monitor the wireless channel and may compete for access to the wireless channel when the wireless channel becomes idle again.

According to one innovative aspect of the subject matter described in this disclosure, the vehicle 123, the data load supervisor 199, a supervised component 190 (and other communication devices as described above) may include a full duplex coordination system for implementing full-duplex wireless communications. The full duplex coordination system may include a processor and a memory storing instructions that, when executed, cause the full duplex coordination system to: create, at a first communication device (such as a supervised component 190, etc.), first data (such as load data 405) to transmit to a second communication device (such as a data load supervisor 199, etc.); switch a half-duplex operation mode of the first communication device to a full-duplex operation mode to activate the full-duplex operation mode of the first communication device; transmit a first portion of the first data from the first communication device to the second communication device using a wireless channel; and transmit, in the full-duplex operation mode of the first communication device, a remaining portion of the first data to the second communication device while simultaneously receiving second data (such as any combination of the data stored on the memory 227) from the second communication device using the wireless channel.

According to another innovative aspect of the subject matter described in this disclosure, a full duplex coordination system for implementing full-duplex wireless communications includes a processor and a memory storing instructions that, when executed, cause the full duplex coordination system to: receive a first portion of first data (such as any combination of the data stored on the memory 227) from a first communication device via a wireless channel; determine that a second communication device is a single destination of the first data based on the first portion of the first data; determine that the second communication device has second data (such as any combination of the data stored on the memory 227) to transmit to the first communication device; determine that the first communication device has full-duplex communication capability; switch a half-duplex operation mode of the second communication device to a full-duplex operation mode to activate the full-duplex operation mode of the second communication device; and transmit, in the full-duplex operation mode of the second communication device, the second data to the first communication device while simultaneously receiving a remaining portion of the first data from the first communication device using the wireless channel.

In general, another innovative aspect of the subject matter described in this disclosure may be embodied in methods that include: creating, at a first communication device, first data to transmit to a second communication device; switching a half-duplex operation mode of the first communication device to a full-duplex operation mode to activate the full-duplex operation mode of the first communication device; transmitting a first portion of the first data from the first communication device to the second communication device using a wireless channel; and transmitting, in the full-duplex operation mode of the first communication device, a remaining portion of the first data to the second communication device while simultaneously receiving second data from the second communication device using the wireless channel.

Yet another innovative aspect of the subject matter described in this disclosure may be embodied in methods that include: receiving a first portion of first data from a first communication device via a wireless channel; determining that a second communication device is a single destination of the first data based on the first portion of the first data; determining that the second communication device has second data to transmit to the first communication device; determining that the first communication device has full-duplex communication capability; switching a half-duplex operation mode of the second communication device to a full-duplex operation mode to activate the full-duplex operation mode of the second communication device; and transmitting, in the full-duplex operation mode of the second communication device, the second data to the first communication device while simultaneously receiving a remaining portion of the first data from the first communication device using the wireless channel.

Another innovative aspect of the subject matter described in this disclosure may be embodied in methods that include: determining first data to transmit from a first communication device to a second communication device; and transmitting, from the first communication device that operates in a full-duplex operation mode, the first data to the second communication device while simultaneously receiving second data from the second communication device using a common wireless channel.

Another innovative aspect of the subject matter described in this disclosure may be embodied in methods that include: receiving, from a first communication device, first data at a second communication device via a wireless channel; determining second data to transmit from the second communication device to the first communication device responsive to receiving at least a portion of the first data; and transmitting, from the second communication device that operates in a full-duplex operation mode, the second data to the first communication device using the wireless channel while simultaneously receiving the first data from the first communication device.

Another innovative aspect of the subject matter described in this disclosure may be embodied in methods that include: determining, at a first communication device, first data to transmit to a second communication device; switching the first communication device from a half-duplex operation mode to a full-duplex operation mode; transmitting, in the full-duplex operation mode of the first communication device, the first data to the second communication device while simultaneously receiving second data from the second communication device using the wireless channel; and switching the full-duplex operation mode of the first communication device to the half-duplex operation mode responsive to a determination that transmission of the first data completes.

Another innovative aspect of the subject matter described in this disclosure may be embodied in methods that include: receiving, from a first communication device, first data at a second communication device via a wireless channel; determining that the second communication device has second data to transmit to the first communication device; switching the second communication device from a half-duplex operation mode to a full-duplex operation mode; transmitting, in the full-duplex operation mode of the second communication device, the second data to the first communication device while simultaneously receiving the first data from the first communication device using the wireless channel; and switching the full-duplex operation mode of the second communication device to the half-duplex operation mode responsive to a determination that transmission of the second data completes.

Other aspects include corresponding methods, systems, apparatus, and computer program products for these and other innovative aspects.

These and other implementations may each optionally include one or more of the following operations and features. For instance, the features include: the first data including a first packet and the first portion of the first data including a header portion of the first packet; the remaining portion of the first data including a payload portion and a trailer portion of the first packet; determining that the second communication device is a single destination of the first data; activating the full-duplex operation mode of the first communication device responsive to the second communication device being the single destination of the first data; the first communication device and the second communication device being communication devices in a wireless local area network; determining that the first communication device operates in a regulated spectrum where full-duplex communication capability is required; receiving device registry data associated with the first communication device; determining that the first communication device has full-duplex communication capability based on the device registry data; and determining that the first communication device has full-duplex communication capability based on a capability indication field in the first portion of the first data, the capability indication field including data describing whether the first communication device has full-duplex communication capability.

For instance, the operations include: determining that the wireless channel is idle; and accessing the wireless channel for data communication between the first communication device and the second communication device based on a channel access rule.

The disclosure is particularly advantageous in a number of respects. For example, the system described herein is capable of achieving a higher throughput and a faster communication speed using full-duplex communication technologies rather than using half-duplex communication technologies. The full-duplex communication may be implemented between vehicles (e.g., communication systems installed in a vehicle 123 such as is depicted in FIG. 1A) or other communication devices that have full-duplex communication capability. In another example, the system coordinates communication between communication devices in a distributed way without using a central coordinator. The system determines a pair of communication devices and coordinates simultaneous transmission of data between the pair of communication devices so that the pair of communication devices may transmit data to each other simultaneously using the same wireless channel. Meanwhile, other communication devices may not transmit data over the wireless channel to avoid collision. The advantages of the system described herein are provided by way of example, and the system may have numerous other advantages.

The disclosure includes a system and method for implementing full-duplex wireless communications between communication devices. A full-duplex coordination system may include a processor and a memory storing instructions that, when executed, cause the full-duplex coordination system to: create, at a first communication device, first data to transmit to a second communication device; switch a half-duplex operation mode of the first communication device to a full-duplex operation mode to activate the full-duplex operation mode of the first communication device; transmit a first portion of the first data from the first communication device to the second communication device using a wireless channel; and transmit, in the full-duplex operation mode of the first communication device, a remaining portion of the first data to the second communication device while simultaneously receiving second data from the second communication device using the wireless channel.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present implementations can be described above primarily with reference to user interfaces and particular hardware. However, the present implementations can apply to any type of computer system that can receive data and commands, and any peripheral devices providing services.

Reference in the specification to "some implementations" or "some instances" means that a particular feature, structure, or characteristic described in connection with the implementations or instances can be included in at least one implementation of the description. The appearances of the phrase "in some implementations" in various places in the specification are not necessarily all referring to the same implementations.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present implementations of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware implementations, some entirely software implementations or some implementations containing both hardware and software elements. In some preferred implementations, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the implementations of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A system of a vehicle comprising:
   one or more hardware processors coupled to a memory;
   a supervised component including a report module stored in the memory and executable by the one or more hardware processors of the vehicle;
   a data load supervisor stored in the memory and executable by the one or more hardware processors of the vehicle; and
   an electronic display panel communicatively coupled to the data load supervisor, wherein the electronic display panel is an element of the vehicle;

wherein the supervised component is communicatively coupled to the data load supervisor via a communicative coupling;
wherein the report module provides load data to the data load supervisor via the communicatively coupling;
wherein the load data describes a data load of the supervised component;
wherein the data load supervisor performs an analysis of the data load to determine whether the data load exceeds a threshold described by a specification associated with the supervised component;
wherein responsive to the data load supervisor determining that the supervised component cannot handle the data load without an accommodation, the data load supervisor stops an operation of a device of the vehicle; and
wherein the data load supervisor causes the electronic display panel to display a message responsive to the analysis.

2. The system of claim 1, wherein the supervised component is an electronic control unit of the vehicle that includes the report module.

3. The system of claim 1, wherein the supervised component is an onboard vehicle computer of the vehicle that includes the report module.

4. The system of claim 1, wherein the supervised component is a network-enabled device of the vehicle that includes the report module.

5. The system of claim 1, wherein the communicative coupling that communicatively couples the supervised component and the data load supervisor is a hard wired communicative coupling.

6. The system of claim 1, wherein the communicative coupling that communicatively couples the supervised component and the data load supervisor is a wireless communicative coupling.

7. The system of claim 1, wherein the report module provides the load data to the data load supervisor via Bluetooth.

8. The system of claim 1, wherein the report module provides the load data to the data load supervisor via Wi-Fi.

9. The system of claim 1, wherein the report module provides the load data to the data load supervisor via Dedicated Short Range Communication.

10. The system of claim 1, wherein the electronic display panel is an element of a head unit included in the vehicle and the head unit is communicatively coupled to the data load supervisor to receive graphical data for causing the electronic display panel to generate a graphical user interface that includes the message.

11. The system of claim 1, wherein the vehicle is an autonomous vehicle and the autonomous vehicle navigates to a break-down lane and powers down responsive to the analysis.

12. A method comprising:
providing, by a report module that is an element of a supervised component of a vehicle, load data to a data load supervisor of the vehicle via a communicatively coupling shared between the supervised component and the data load supervisor, wherein the load data describes a data load of the supervised component;
providing, by the data load supervisor, an analysis of the data load to determine whether the data load exceeds a threshold described by a specification associated with the supervised component;
responsive to determining that the supervised component cannot handle the data load without an accommodation, stopping, by the data load supervisor, an operation of a device of the vehicle; and
providing, by the data load supervisor, graphical data to an electronic display panel to cause the electronic display panel to display a message responsive to the analysis.

13. The method of claim 12, wherein the analysis indicates that the data load exceeds the threshold and the message suggests that the vehicle stop driving immediately.

14. The method of claim 12, wherein the analysis indicates that the data load exceeds the threshold and the message suggests that the vehicle be serviced by a technician.

15. The method of claim 12, wherein
the accommodation further includes one or more of throttling a future data load placed on the supervised component and stopping an operation of a function that would result in an increase in the data load for the supervised component.

16. A computer program product comprising a non-transitory memory storing computer-executable code that, when executed by a processor, causes the processor to:
receive report data from a communicative coupling shared with a supervised component that includes a report module that transmits a message including the report data, wherein the report data describes a data load for the supervised component that is an element of a vehicle;
retrieve specification data for the supervised component that describes a threshold for the data load;
perform an analysis of the data load to determine whether the data load exceeds the threshold;
provide graphical data to an electronic display panel to cause the electronic display panel to display a message responsive to the analysis indicating that the data load exceeds the threshold; and
provide an accommodation to the supervised component so that the data load does not exceed a value that is substantially equal to the threshold, wherein the accommodation includes stopping an operation of a device of the vehicle.

17. The computer program product of claim 16, wherein the message suggests that the vehicle stop driving immediately.

18. The computer program product of claim 16, wherein the message suggests that the vehicle be serviced by a technician.

19. The computer program product of claim 16, wherein the accommodation includes throttling a future data load placed on the supervised component.

20. The computer program product of claim 16, wherein the accommodation further includes stopping an operation of a function that would result in an increase in the data load for the supervised component.

* * * * *